US009870577B1

(12) United States Patent
Yang et al.

(10) Patent No.: US 9,870,577 B1
(45) Date of Patent: Jan. 16, 2018

(54) CONDITIONAL BIDS IN AN AUCTION (71) Applicant: Google Inc., Mountain View, CA (US)

(72) Inventors: Kai Yang, Katonah, NY (US); Douglas N. Gordin, Katonah, NY (US); Kim Burchett, Brooklyn, NY (US); Gang Wang, Frederick, MD (US)

(73) Assignee: Google Inc., Mountain View, CA (US)

( * ) Notice: Subject to any disclaimer, the term of this patent is extended or adjusted under 35 U.S.C. 154(b) by 683 days.

(21) Appl. No.: 14/154,047

(22) Filed: Jan. 13, 2014

(51) Int. Cl.
G06Q 30/00 (2012.01)
G06Q 30/02 (2012.01)

(52) U.S. Cl.
CPC .................. G06Q 30/0275 (2013.01)

(58) Field of Classification Search
CPC . G06Q 30/0275; G06Q 30/0269; G06Q 30/02
USPC .......................................... 705/14
See application file for complete search history.

(56) References Cited

U.S. PATENT DOCUMENTS

| 6,460,036 B1* | 10/2002 | Herz ................. G06F 17/30867 348/E7.056 |
| 2003/0163359 A1* | 8/2003 | Kanesaka ............. G06Q 30/02 705/7.33 |
| 2005/0004837 A1* | 1/2005 | Sweeney ................ G06Q 30/02 705/14.16 |
| 2007/0088609 A1* | 4/2007 | Reller .................... G06Q 30/02 705/14.71 |
| 2010/0138290 A1* | 6/2010 | Zschocke ........... G06Q 30/0242 705/14.41 |
| 2010/0323716 A1* | 12/2010 | Jaffri ...................... G06Q 30/02 455/456.1 |
| 2010/0324974 A1* | 12/2010 | D'Ambrosio .......... G06Q 30/02 705/310 |

(Continued)

FOREIGN PATENT DOCUMENTS

WO 2012/088596 7/2012

OTHER PUBLICATIONS

Chen et al., "Real-Time Bidding Algorithms for Performance-Based Display Ad Allocation," KDD '11, Aug. 21-24, 2011, 9 pages.

(Continued)

Primary Examiner — Vincent Cao
(74) Attorney, Agent, or Firm — Fish & Richardson P.C.

(57) ABSTRACT

Methods, systems, and apparatus include computer programs encoded on a computer-readable storage medium for providing content. A method includes: identifying a placement opportunity for content for a user device characterized as being included in a group in which the group is defined by a user having a specific attribute; providing a bid request to content sponsors, the bid request including characteristic information that identifies information known to a serving system about the user without specifying the attribute that is associated with the user; receiving conditional bids conditioned on the user having a specific attribute from the content sponsors that establish a price to be used in an auction for the placement opportunity; evaluating the received bids in view of the attribute associated with the user including using received bids in the auction to determine a content item for the placement opportunity; and providing a content item for the placement opportunity.

20 Claims, 6 Drawing Sheets (56) References Cited

U.S. PATENT DOCUMENTS

2011/0150193 A1* 6/2011 Cain ............... G06Q 30/02
                                                            379/88.22

OTHER PUBLICATIONS

Balakrishnan and Bhatt, "Real-Time Bid Optimization for Group-Buying Ads," In Proceedings of CoRR. 2012, Jun. 3, 2012, 10 pages.

'NextBigWhat' [online]. "Demystified : Programmatic Buying and Real Time Bidding (RTB)," Jul. 9, 2013 [retrieved on Aug. 8, 2014]. Retrieved from the Internet: URL<http://www.nextbigwhat.com/programmatic-buying-and-real-time-bidding-297/>, 5 pages.

* cited by examiner

CONDITIONAL BIDS IN AN AUCTION

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content. The method includes: identifying, by one or more processors, a placement opportunity for content, the placement opportunity being associated with a user device, the user associated with the user device being characterized as being included in a group in which the group is defined by the user having a specific attribute; providing a bid request to a plurality of content sponsors, the bid request including characteristic information, wherein the characteristic information identifies information known to a serving system about the user without specifying the attribute that is associated with the user; receiving bids from the content sponsors including one or more conditional bids that establish a price to be used in an auction for the placement opportunity, the price associated with a conditional bid being conditioned on the user having a specific attribute; evaluating the received bids from the content sponsors in view of the attribute associated with the user including using conditional bids that have been received from the content sponsors that are associated with the attribute in the auction to determine a content item for placement in the placement opportunity; and providing a content item for placement in the placement opportunity based on the evaluating.

In general, another aspect of the subject matter described in this specification can be implemented in computer program products. A computer program product is tangibly embodied in a computer-readable storage device and comprises instructions. The instructions, when executed by a processor, cause the processor to: identify a placement opportunity for content, the placement opportunity being associated with a user device, the user associated with the user device being characterized as being included in a group in which the group is defined by the user having a specific attribute; provide a bid request to a plurality of content sponsors, the bid request including characteristic information, wherein the characteristic information identifies information known to a serving system about the user without specifying the attribute that is associated with the user; receive bids from the content sponsors including one or more conditional bids that establish a price to be used in an auction for the placement opportunity, the price associated with a conditional bid being conditioned on the user having a specific attribute; evaluate the received bids from the content sponsors in view of the attribute associated with the user including using conditional bids that have been received from the content sponsors that are associated with the attribute in the auction to determine a content item for placement in the placement opportunity; and provide a content item for placement in the placement opportunity based on the evaluating.

In general, another aspect of the subject matter described in this specification can be implemented in systems. A system includes one or more processors and one or more memory elements including instructions. The instructions, when executed, cause the one or more processors to: identify a placement opportunity for content, the placement opportunity being associated with a user device, the user associated with the user device being characterized as being included in a group in which the group is defined by the user having a specific attribute; provide a bid request to a plurality of content sponsors, the bid request including characteristic information, wherein the characteristic information identifies information known to a serving system about the user without specifying the attribute that is associated with the user; receive bids from the content sponsors including one or more conditional bids that establish a price to be used in an auction for the placement opportunity, the price associated with a conditional bid being conditioned on the user having a specific attribute; evaluate the received bids from the content sponsors in view of the attribute associated with the user including using conditional bids that have been received from the content sponsors that are associated with the attribute in the auction to determine a content item for placement in the placement opportunity; and provide a content item for placement in the placement opportunity based on the evaluating.

These and other implementations can each optionally include one or more of the following features. The placement opportunity can be an advertisement slot on a page associated with a publisher. The characteristic information can include demographic information and the attribute can be a specific demographic characteristic of the user. The characteristic information can include user lists and providing bid requests can include providing identifying information for plural user lists to each of the content sponsors including at least one user list that is associated with the user and at least one user list that is not associated with the user. The characteristic information can include geo-location data and providing bid requests can include providing plural geo-locations including one associated with the user and at least one associated with a location where the user is not currently located. The bid request can include or not include a cookie. A content sponsor associated with a winning bid in the auction can be charged an amount that is based on a price indicated in an associated received conditional bid that specifies the specific attribute. The characteristic information can include user interests and providing the bid requests can include providing an interest area associated with the user and at least one interest area not associated with the user, wherein the specific attribute is the interest area associated with the user. Providing the bid request can be in real time after identification of the placement opportunity and bids can be received in real time in order to support the real time auction of the placement opportunity. A user interface can be presented to a content sponsor that includes the bid request, the characteristic information and a control for enabling the content sponsor to create conditional bids for users having specific attributes. The characteristic information can include plural scenarios, including a first scenario associated with one or more attributes including the specific attribute that is associated with the user and a second scenario associated with one or more attributes that are known not to be associated with the user. Providing the bid request can include providing a request for a bid on each scenario. Received bids for the first scenario can be processed and bids associated with the second scenario can be disregarded.

Particular implementations may realize none, one or more of the following advantages. A content management system can provide a bid request to multiple content sponsors that includes characteristic information known about a user device upon which content is to be presented without specifying particular attributes associated the user device.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In a real-time bidding environment, a placement opportunity for content can be identified. The real time bidding environment can be one where, for example, one or more content sponsors are contacted after a placement opportunity has been identified. The placement opportunity can be for a content slot on a resource and can be associated with a user who is characterized as being included in a group or having a certain attribute. The group can be, for example, a group of users having a same attribute for a particular characteristic. For example, female users are users who have an attribute value of female for a gender characteristic. In response to identifying the placement opportunity, a bid request can be provided to a plurality of content sponsors. The bid request can include characteristic information that identifies a characteristic known about the user without specifying the actual attribute that is associated with the user. For example, the bid request can indicate that the user's gender is known without specifying the actual gender. Conditional bids can be received from the content sponsors that establish a price to be used in an auction for the placement opportunity, with a respective price associated with a conditional bid being conditioned on the user having a specific attribute. For example, a content sponsor can specify a first conditional bid conditioned upon the user being male and a second conditional bid conditioned upon the user being female. The received bids from the content sponsors can be evaluated in view of the actual attribute value (e.g., male or female) associated with the user to determine a content item for placement in the placement opportunity.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
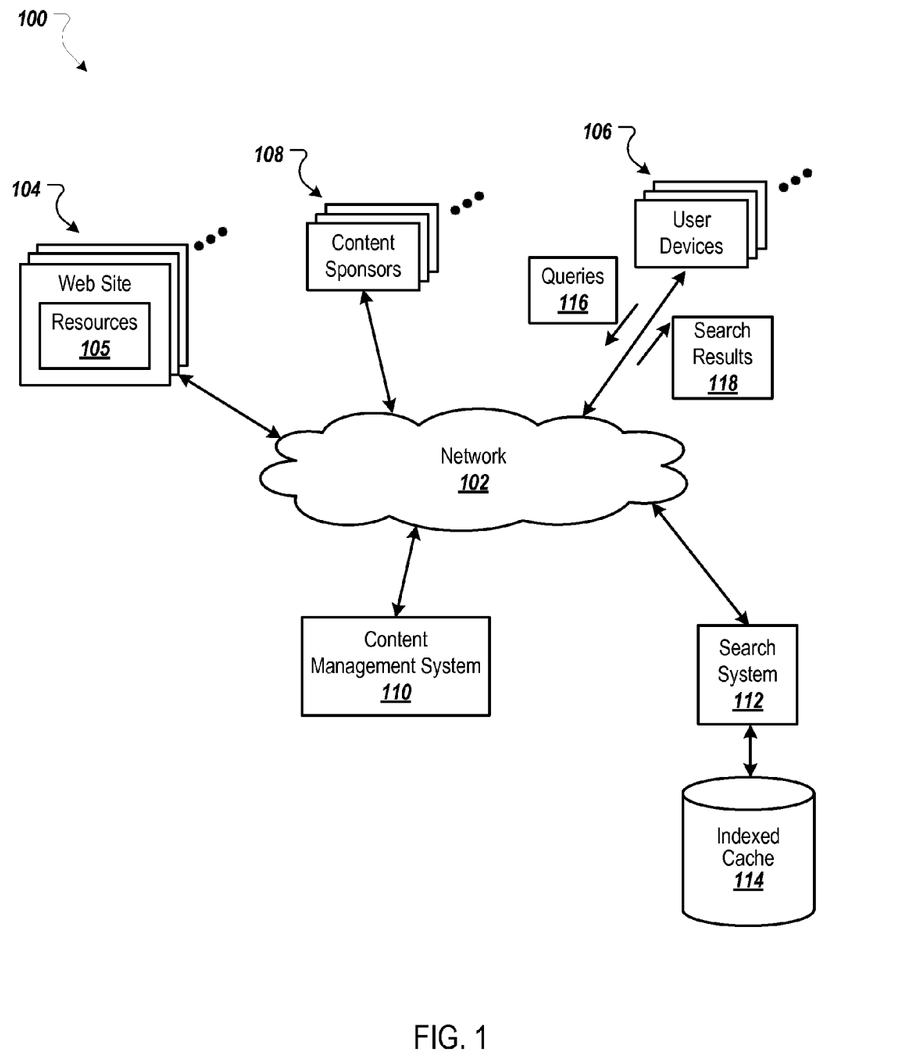
FIG. 1 is a block diagram of an example environment for presenting content.

FIG. 1 is a block diagram of an example environment 100 in which content items are distributed by a content management system. For example, the environment 100 includes a content management system 110 that manages content services. The example environment 100 also includes a network 102, such as a local area network (LAN), a wide area network (WAN), the Internet, or a combination thereof. The network 102 connects websites 104, user devices 106, content sponsors 108, and the content management system 110. The example environment 100 may include many thousands of websites 104, user devices 106, and content sponsors 108.

A website 104 is one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a publisher, which is an entity that controls, manages and/or owns the website 104.

A resource 105 can be any data that can be provided over the network 102. A resource 105 can be identified by a resource address that is associated with the resource 105. Resources include HTML pages, word processing documents, and portable document format (PDF) documents, images, video, and feed sources, to name only a few. The resources 105 can include content, such as words, phrases, images and sounds, that may include embedded information (such as meta-information in hyperlinks) and/or embedded instructions (such as scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a specified area of a web page) in which content items can be presented. These specified portions of the resource or user display can be referred to as content item slots (or, in some implementations, advertisement slots).

To facilitate searching of resources 105, the environment 100 can include a search system 112 that identifies the resources 105, for example, by crawling and indexing the resources 105 provided by the publishers on the websites 104. Data about the resources can be indexed based on the resource 105 to which the data corresponds. The indexed and, optionally, cached copies of the resources 105 can be stored in a search index 114.

User devices 106 can submit search queries 116 to the search system 112 over the network 102. In response, the search system 112 accesses the search index 114 to identify resources that are relevant to the search query 116. The search system 112 can identify the resources 105 in the form of search results 118 and return the search results 118 to the user devices 106 in search results pages. A search result 118 is data generated by the search system 112 that identifies a resource 105 that is responsive to a particular search query 116, and includes a link to the resource. An example search result 118 can include a web page title, a snippet of text or a portion of an image extracted from the web page, and the URL of the web page. Search results pages can also include one or more content slots in which content can be presented.

When a resource 105 or search results 118 are requested by a user device 106, the content management system 110 receives a request (i.e., a content request) for content to be provided with the resource 105 or search results 118. The request for content can include characteristics of the content slots that are defined for the requested resource or search results page, and can be provided to the content management system 110. For example, a reference (e.g., URL) to the resource (e.g., a retailer's web page or a web page for a sports network) for which the content slot is defined, a size of the content slot, and/or media types that are available for presentation in the content slot can be provided to the content management system 110. Similarly, keywords associated with a requested resource 105 or a search query 116 for which search results are requested can also be provided to the content management system 110 to facilitate identification of content items that are relevant to the resource 105 or search query 116.

The content management system 110 can be configured to interact with multiple content sponsors 108 that can provide content in response to a content request submitted to the content sponsors 108. The content management system 110 can be configured to trigger the generation of one more bid requests to the content sponsors 108 to submit bids (e.g., in real time) to compete for the opportunity to provide a content item in response to the content request. The bid request can include selection criteria, such as resource keywords for the resource 105 with which the selected content item will be provided, characteristics of the content slot in which the content item will be provided, and characteristic information about the user device 106 on which the content item will be presented.

A user device 106, for example, can be characterized as being associated with a group of user devices, wherein the group is defined by the user devices in the group having a specific attribute. For instance, user devices in a group can be user devices associated with a particular demographic, such as male users, female users, or users in a particular age group, users at a particular location, users included in a particular user list, or users having a particular interest, to name a few examples.

The bid request sent to the respective content sponsors 108 can include characteristic information that identifies one or more types of information known to the content management system 110 about the requesting user device 106 without specifying particular attributes that are associated with the user device 106. For example, the bid request can identify a gender characteristic without specifying whether the user device 106 is associated with a male attribute or a female attribute. Specifying characteristic information without specifying particular attributes can prevent leakage of user device 106 information to content sponsors (e.g., as described in more detail below). The content management system 110 can, for example, implement procedures to prevent leakage of user device 106 information so as to prevent content sponsors 108 from creating user lists or marketing lists without paying for user device 106 information.

One or more content sponsors 108 can provide a conditional bid to the content management system 110 in response to a received bid request. A received conditional bid can establish a price to be used in an auction for a content slot associated with the bid request. A respective price associated with a conditional bid can be conditioned on the user device 106 having a specific value for the designated attribute. For example, a content sponsor 108 can specify a first conditional bid conditioned upon the user device 106 being associated with a male user and a second conditional bid conditioned upon the user device 106 being associated with a female user.

In some implementations, the content management system 110 can evaluate bid requests in the aggregate. For example, the content management system 110 can evaluate prices being bid for male-related vs. female-related impressions, such as to determine market demand related to gender. Content sponsor bidding on particular characteristics can represent content sponsor valuation of those characteristics.

Based on the received bids and on information included in the content request, the content management system 110 can select one or more content items that are eligible to be provided in response to the request. Eligible content items can include, for example, content items having characteristics matching the characteristics of content slots and that are identified as relevant to specified resource keywords or search queries 116. In some implementations, content items having selection keywords that match the resource keywords (or other selection criteria) or the search query 116 are selected as eligible content items by the content management system 110.

The content management system 110 can select the content sponsor 108 that will provide a content item for presentation in response to the content request based on results of an auction. As mentioned, the content management system 110 can receive conditional bids from one or more of the content sponsors 108. The content management system 110 can evaluate the received conditional bids in view of attributes associated with the requesting user device 106. Conditional bids that have been received responsive to the bid request that are associated with a particular value of an attribute that is not satisfied by the current request are disregarded. A content item associated with a winning content sponsor 108 can be provided to the requesting user device 106.

Figure 2A:
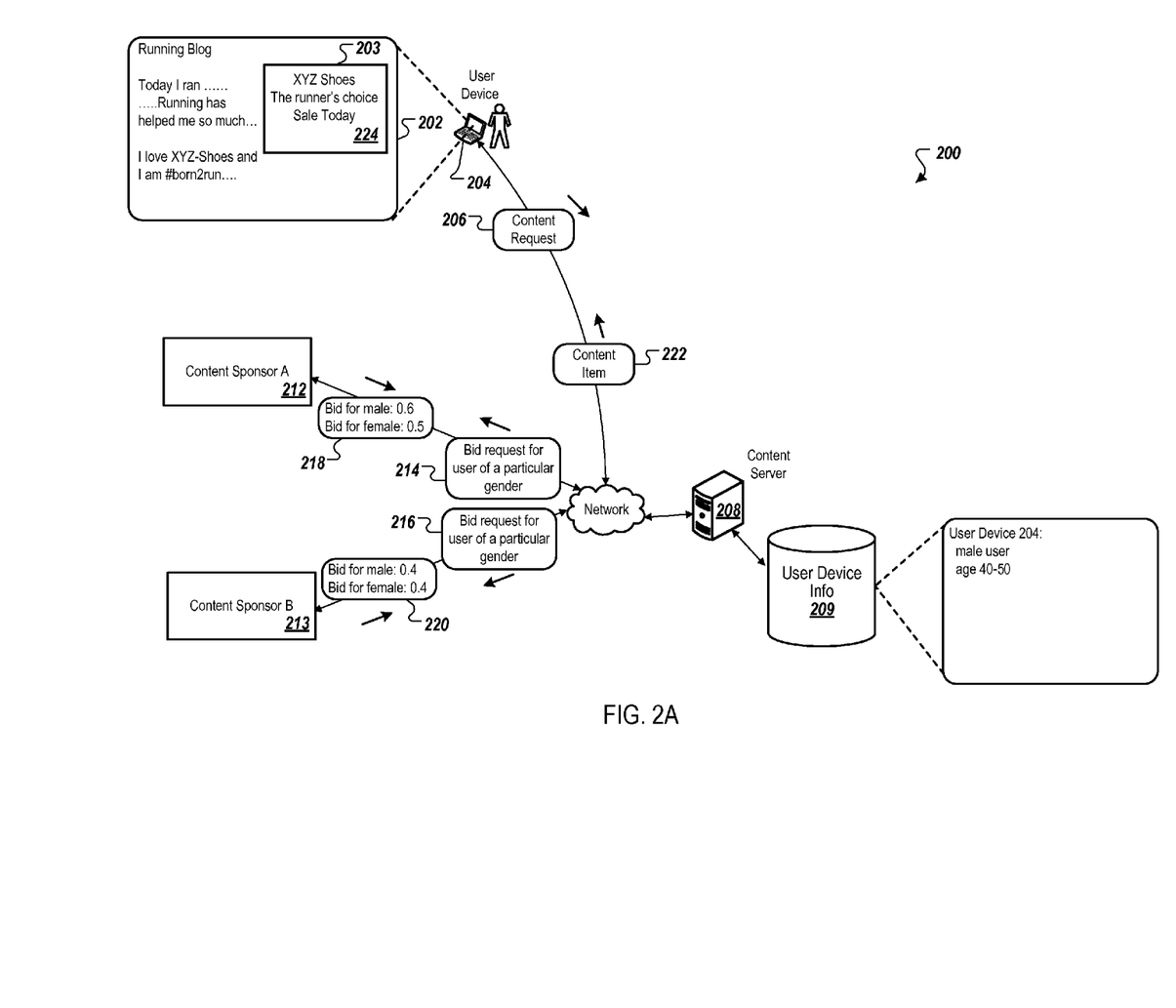
FIG. 2A is a block diagram of an example system for providing content.

FIG. 2A is a block diagram of an example system 200 for providing content. A web page 202 that includes a content slot 203 is displayed on a user device 204. The web page 202 is configured to send a content request 206 to a content server 208 for a content item to display in the content slot 203. The content request 206 can include, for example, an identifier (e.g., a cookie) associated with the user device 204 and selection criteria, such as selection criteria associated with the content slot 203 and/or the web page 202. Alternatively, the user device 204 may be previously known (based on a previous user login or use of a tool bar or the like). The content server 208 can identify user device information associated with the user device identifier in a user device information repository 209. For example, the user device information can indicate that the user device 204 is associated with a male user.

In response to receiving the content request 206, the content server 208 can submit bid requests to multiple content sponsors. The content server 208 can identify content sponsors to which to send bid requests, such as content sponsors that have configured content campaigns that include selection criteria that match selection criteria associated with the content request 206. For example, the content server 208 can identify a first content sponsor 212 and a second content sponsor 213. For example, a first bid request 214 can be sent to the first content sponsor 212 and a second bid request 216 can be sent to the second content sponsor 213. The bid requests 214 and 216 can include an indication that the content server 208 is aware of an attribute (e.g., attribute value) for a particular characteristic associated with the requesting user device 204 without including an indication of the actual attribute value. For example, the bid requests 214 and 216 can indicate that a particular gender of either male or female is associated with the requesting user device 204 without indicating the actual gender.

The first content sponsor 212 can send a response 218 to the bid request 214 to the content server 208. The response 218 can include a first conditional bid price (e.g., $0.60) that is conditioned upon the user device 204 having a male attribute and a second conditional bid price (e.g., $0.50) that is conditioned upon the user device 204 having a female attribute. Similarly, the second content sponsor 213 can send a response 220 to the bid request 216 to the content server 208, and the response 220 can include a third conditional bid price that is conditioned upon the user device 204 having a male attribute and a fourth conditional bid price that is conditioned upon the user device 204 having a female attribute.

The content server 208 can evaluate the received conditional bids in the responses 218 and 220 in view of the attribute associated with the user device 204 (e.g., in view of the user device 204 being associated with a male user). For example, the content server 220 can associate a bid of $0.60 with the first content sponsor 212 and a bid of $0.40 with the second content sponsor 213 and can conduct an auction using the associated bids and using other information, such as quality scores associated with the first content sponsor 212, the second content sponsor 213, or content items associated with the first content sponsor 212 or the second content sponsor 213. The second and fourth conditional bids can be disregarded (i.e., they are not satisfied by the actual gender associated with the requesting user). The content server 208 can determine an auction winner based on one or more factors (e.g., the first content sponsor 212) and thereby determine a content item 222 to provide in response to the content request 206. The content server 208 can provide the determined content item 222 to the user device 204, for presentation in the content slot 203, as illustrated by a presented content item 224.

Figure 2B:
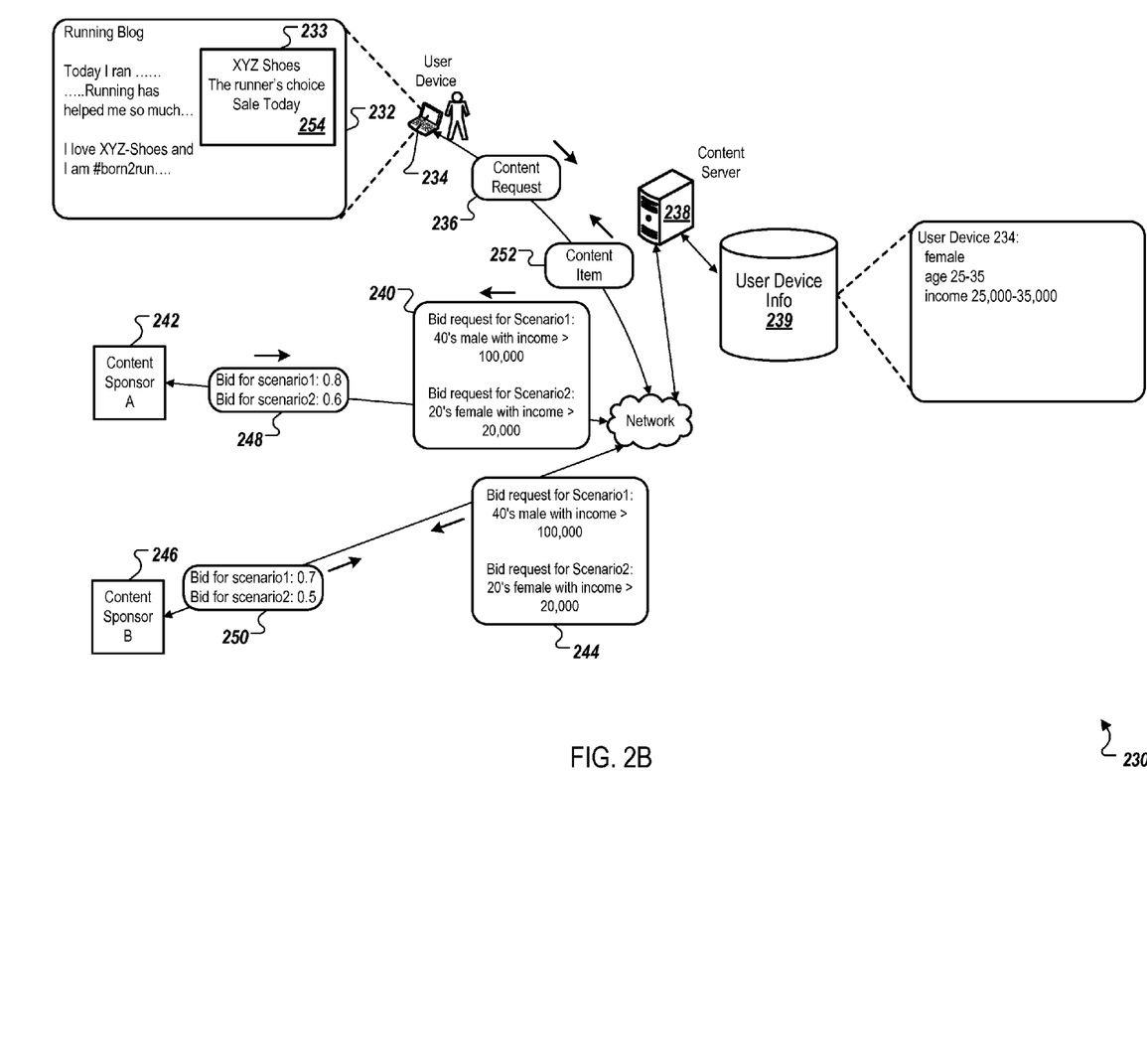
FIG. 2B illustrates an example system for providing a bid request that includes multiple options.

A bid request can include characteristic information other than gender. For example, a bid request can include other demographic information associated with the user device 204, such as age or income. The characteristic information can include other types of information, such as geo-location information, user-list information, or user interest information, to name a few examples. A bid request can include multiple types of characteristic information. For example, a bid request can indicate characteristic information of an age and a gender. A content sponsor can provide a conditional bid for each characteristic (e.g., a bid for a particular gender and a bid for an age that is within a specified age range). As described below, a bid request can include multiple options and a content sponsor can bid on each of the multiple options FIG. 2B illustrates an example system 230 for providing a bid request that includes multiple options. A web page 232 that includes a content slot 233 is displayed on a user device 234. The web page 232 is configured to send a content request 236 to a content server 238 for a content item to display in the content slot 233. The content server 238 can identify user device information associated with the user device identifier in a user device information repository 239. For example, the user device information can indicate that the user device 234 is associated with a female user with an age in a range of between 25 and 35 years of age and an income in a first predefined range (e.g., $25,000 to $35,000).

In response to receiving the content request 236, the content server 238 can submit a first bid request 240 to a first content sponsor 242 and a second bid request 244 to a second content sponsor 246. The bid requests 240 and 244 can each include a request for a bid for a first option (e.g., "Scenario1"), for a second option (e.g., "Scenario2") and one or more additional options (e.g., including some or all permutations of the known attributes). When multiple options are included in a bid request, one of the options (e.g., the second scenario in this example) can be associated with one or more attributes that are associated with the user device 234, while at least one of the attributes can be specifically selected as being not associated with the user device 234. For example, the gender of female, the age of 25-35, and the income of $25-35 k may be associated with the second scenario. When multiple scenarios are included in a bid request, one or more of the included scenarios can include plural attributes that are known not to be associated with the user device. For example, the first scenario is associated with a male gender and an age between forty and forty nine, and such attributes are not associated with the user device 234.

Multiple scenarios can be provided to obfuscate attribute values associated with the requesting user device that might be learned or inferred when a content sponsor wins an auction. For example, if a bid request includes a gender characteristic and a content sponsor wins the auction, the content sponsor may learn or infer that the requesting user device is associated with a male user. For example, in some implementations, the content sponsor may be able to submit a bid for only a male user, or may submit a competitive bid for a male user and a non-competitive bid (e.g., a smallest allowable bid) for a female user, meaning that the content sponsor may infer that any winning bid is associated with a male user/user device. When a content sponsor wins an auction for which multiple bids for multiple scenarios are provided, the content sponsor is not given an indication as to which scenario was used in the auction, and therefore can't infer attribute information for the requesting user device. In some implementations, the content server 238 does not report a specific price paid by a content sponsor for an impression but rather reports payment in aggregate (e.g., by the hour or day).

In response to the bid request 240, the first content sponsor 242 can provide a response 248 that includes a first bid for the first scenario and a second bid for the second scenario (and bids for one or more additional options presented). Similarly, in response to the bid request 244, the second content sponsor 246 can provide a response 250 that includes a third bid for the first scenario and a fourth bid for the second scenario. In this example, the second scenario is associated with characteristic information known to be associated with the requesting user device 234 and the first scenario is associated with characteristic information known not to be associated with the requesting user device 234.

Accordingly, the received bids for the first scenario can be disregarded (e.g., ignored, not processed). The received bids associated with the second scenario can be evaluated in view of the attributes associated with the user device 234, to determine which bids are to be evaluated when determining a content item to provide in response to the content request 236. For example, the content server 208 can determine an auction winner (e.g., the first content sponsor 242) and determine a content item 252 to provide in response to the content request 236 based on evaluating an appropriate bid and one or more quality factors associated with a respective bid. The content server 238 can provide the determined content item 252 to the user device 234, for presentation in the content slot 233, as illustrated by a presented content item 254.

Figure 2C:
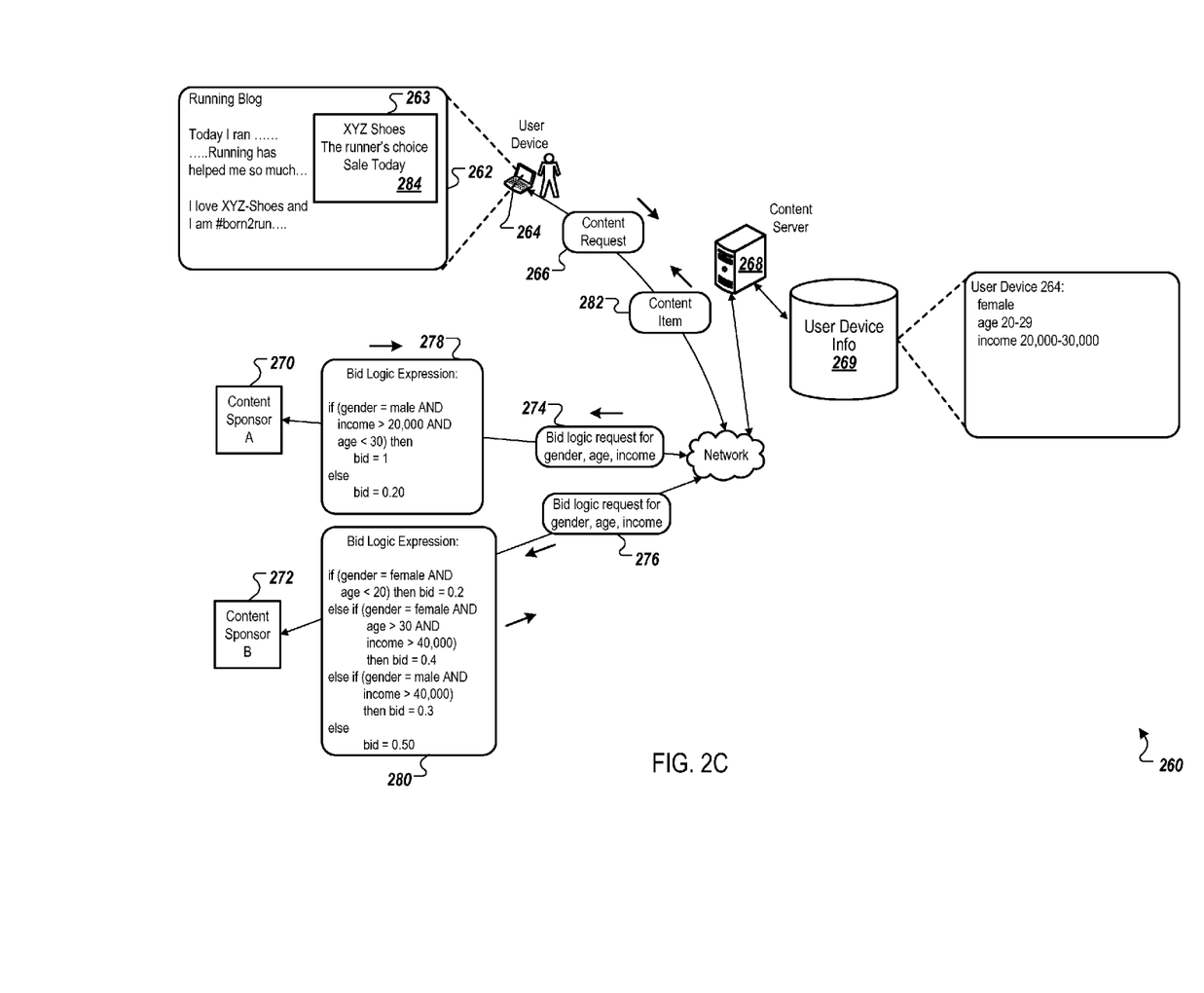
FIG. 2C illustrates an example system for providing a request for bid logic.

FIG. 2C illustrates an example system 260 for providing a request for bid logic. A web page 262 that includes a content slot 263 is displayed on a user device 264. The web page 262 is configured to send a content request 266 to a content server 268 for a content item to display in the content slot 263. The content server 268 can identify user device information associated with the user device identifier in a user device information repository 269. For example, the user device information can indicate that the user device 264 is associated with a female user with an age in a first age group (e.g., 20-29 years old or a specific age) and an income in a first specific range (e.g., 20-30 k).

Rather than provide a bid request for a bid price to a first content sponsor 270 and a second content sponsor 272, the content server 268 can submit a bid logic request 274 to the first content sponsor 270 and a bid logic request 276 to the second content sponsor 272. The bid logic requests 274 and 276 can include characteristic information that indicates that the content server knows an age, income, and gender associated with the requesting user device 264.

The first content sponsor 270 can provide a bid logic expression 278 in response to the bid logic request 274. Similarly, the second content sponsor 272 can provide a bid logic expression 280 in response to the bid logic request 276. In some implementations, the content server 268 provides a user interface with which the first content sponsor 270 and the second content sponsor 272 can define the bid logic expression 278 or bid logic expression 280, respectively, along with other bid logic expressions including other characteristics or combinations of characteristics. For example, bid logic expressions can be defined when the first content sponsor 270 or second content sponsor 272 create or edit content campaigns.

A bid logic expression can include, for example, one or more arguments, one or more operators, and one or more literal values. The operators can be, for example, relational operators (e.g., $<$, $>$, $<=$, $>=$, $=$, $!=$) and/or logical operators (e.g., AND, OR). An argument can correspond, for example, to a characteristic (e.g., gender). A literal value can correspond to a value to which a characteristic attribute is to be compared. For example, a gender attribute can be compared to "male" or "female", an age attribute can be compared to a particular age (e.g., twenty eight) or an age range (e.g., twenty to thirty). Logical operators can be used to create compound bid logic expressions. For example, if A, B, and C are bid logic expressions each relating to a single characteristic, a compound bid logic expression can be defined which has a form of A AND (NOT B) AND C, meaning a content sponsor desires expression A to be true, expression B to be not true, and expression C to be true.

The bid logic expressions 278 and 280 can be evaluated by the content server 268 in light of attribute information known about the user device for characteristics included in the bid logic requests 274 and 276. For example, the content server 268 can evaluate the bid logic expression 278 given the attributes of female gender, age of 20-29, and income of $20-30 k. The result of the evaluation of the bid logic expression 278 given these attributes is a bid of $0.20. The content server 268 can evaluate the bid logic expression 280 using the same attributes and can determine an evaluation result of a bid of $0.50. The content server 268 can determine an auction winner (e.g., the second content sponsor 272) and determine a content item 282 to provide in response to the content request 266. The content server 268 can provide the determined content item 282 to the user device 264, for presentation in the content slot 263, as illustrated by a presented content item 284.

In some implementations, a bid logic expression can include a base bid and one or more sub-expressions, with each sub-expression corresponding to a characteristic and indicating a respective change to the base bid conditioned on the characteristic having a particular attribute value. For example, a bid logic expression can specify that a base bid is $1.00 and that the base bid is to be incremented by $0.50 when a gender attribute is male and incremented by $0.25 when the gender attribute is female. Each sub-expression can be defined by including a reference to only one characteristic, which can result in easier definition of bid logic expressions that include multiple characteristics as compared to bid logic expressions that include logical operators such as AND and OR. For example, a bid logic expression can specify that a base bid is $0.50 and when an income value is greater than a threshold the base bid is to be increased by twenty five percent, when the income value is less than the threshold the base bid is to be increased by twenty five percent, when an age value is within a first range $0.10 is to be added to the base bid, and when the age value is within a second range $0.05 is to be added to the base bid.

For example, base bid is $1. If male, add $0.50. If female, add $0.25. Or, if high income, increase bid by 25%, if low income decrease by 25%. This gives compact way to bid on many attributes that would have required exponential individual bids.

Figure 3:
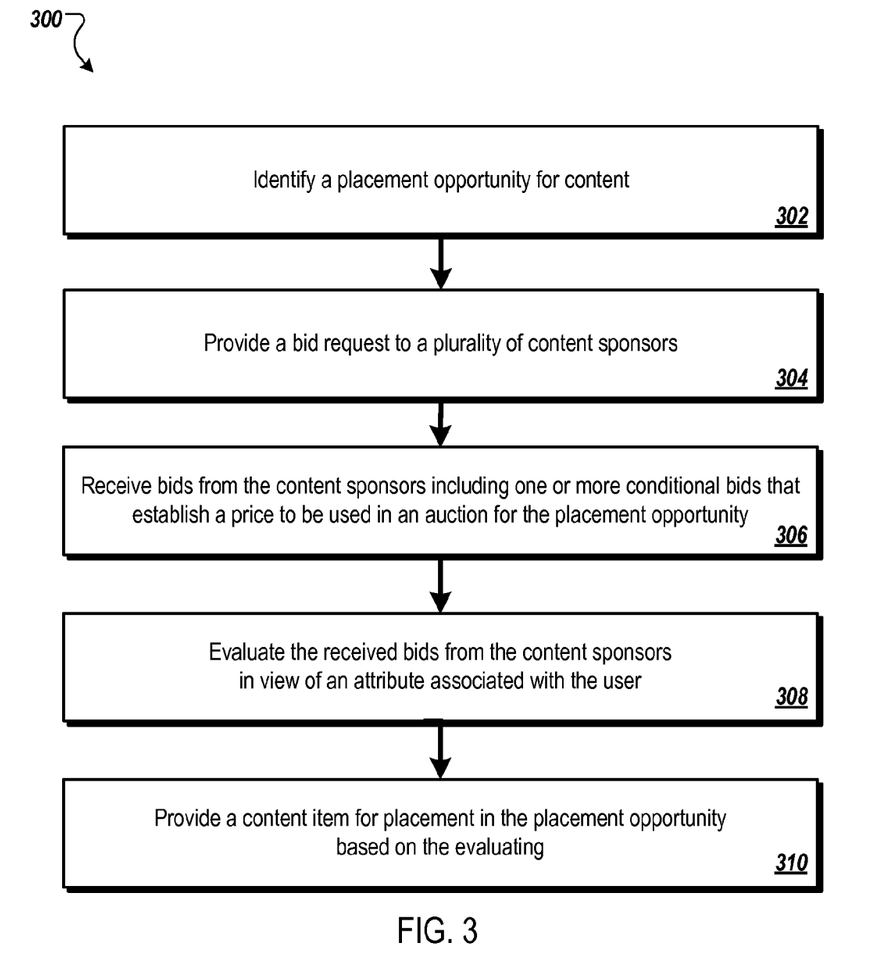
FIG. 3 is a flowchart of an example process for providing content.

FIG. 3 is a flowchart of an example process 300 for providing content. The process 300 can be performed, for example, by the content management system 110 described above with respect to FIG. 1.

A placement opportunity for content is identified (302), the placement opportunity being associated with a user device, the user device being characterized as being included in a group in which the group is defined by the user that is associated with the user device having a specific attribute (e.g., having a value associated with the specific attribute). The placement opportunity can be, for example, an advertisement slot on a page associated with a publisher.

A bid request is provided to a plurality of content sponsors (304), the bid request including characteristic information, wherein the characteristic information identifies information known to a serving system about the user associated with the user device without specifying the attribute (e.g., value) that is associated with the user. The characteristic information can include demographic information, user lists, geo-location data, or user interests, to name a few examples. The attribute associated with the user can be, for example, a male gender, a female gender, a particular income range, inclusion in a particular user list, a particular location, or a particular interest. In some implementations, the bid request includes an identifier for the user device (e.g., a cookie). In some implementations, the bid request does not include a cookie, and the user can be identified by other means (e.g., based on a previous login).

In some implementations, the characteristic information includes plural options. For example, a first option can be associated with one or more attributes including a specific attribute that is associated with the user/user device. A second scenario can be associated with one or more attributes that are known not to be associated with the user/user device. When the bid request includes multiple scenarios, the bid request can include a request for a bid for each option. For example, the bid request can include identifying information for multiple user lists including at least one user list that is associated with the user and at least one user list that is not associated with the user. As another example, the bid request can include an interest area associated with the user and at least one interest area not associated with the user.

When the characteristic includes geo-location data, the bid request can include plural geo-locations including one location associated with the user/user device and at least one location at which the user is not currently located. As another example, the characteristic information can include a city or postal code associated with the user/user device and an indication that the exact location of the user/user device is known.

Bids are received from the content sponsors including one or more conditional bids that establish a price to be used in an auction for the placement opportunity (306), the price associated with a conditional bid being conditioned on the user having a specific attribute (e.g., value of the attribute) When multiple options are included in the bid request, the content sponsors can provide a bid for each option. When the bid request includes an indication that the exact location of the user is known, the content sponsor can provide a bid for a particular geographic area. For example, the content sponsor can provide a bid which specifies that if the user is within two hundred meters of a particular location specified using a particular longitude and latitude or other reference information, a bid (previously specified) is to be increased by fifty percent. As another example, the content sponsor can define a geographic area as a polygon and a bid that is conditioned upon the user being within the geographic area.

The received bids from the content sponsors are evaluated in view of the attribute value associated with the user (308), including using conditional bids that have been received from the content sponsors to determine a content item for placement in the placement opportunity. When the bid request includes multiple options, with a first scenario associated with one or more attributes including a specific attribute that is associated with the user/user device and a second scenario associated with one or more attributes that are known not to be associated with the user/user device, received bids for the first scenario can be processed and received bids for the second scenario can be disregarded. The content sponsor associated with the winning bid in the auction can be charged an amount that is based on a price indicated in an associated received conditional bid that specifies the specific attribute (e.g., value of the attribute).

In some implementations, screening or filtering of bids can occur, to protect against leakage of user/user device information. For example, a determination may be made that a particular content sponsor bids a high bid for a particular user or set of users and does not bid or bids low for other users. In response to such a determination, such bids can be disregarded. Other forms of filtering can be used to prevent leakage of information.

A content item is provided for placement in the placement opportunity based on the evaluating (310). For example, a content item associated with an auction-winning content sponsor can be provided to the user device.

Figure 4:
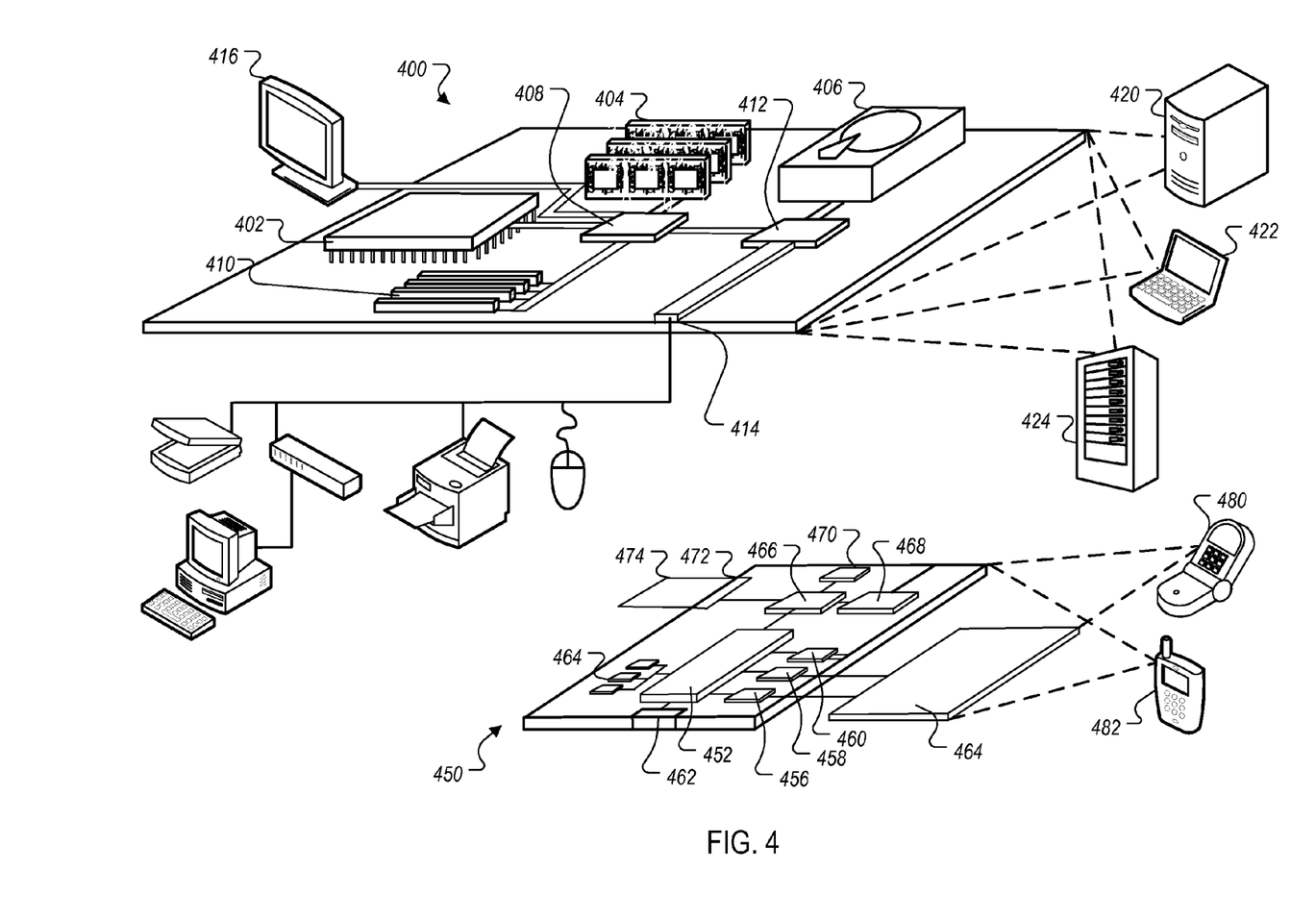
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. The computer-readable medium is not a propagating signal. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is illustrative only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth®, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
identifying, by one or more processors, a placement opportunity for content to be presented on a user device, a user of the user device being characterized as being included in one or more groups in which each group is defined by the user having a respective attribute value for a respective attribute type;
providing a bid request to a plurality of content sponsors, the bid request including characteristic information, wherein the characteristic information comprises a plurality of attributes types that each identifies a type of information known to a serving system about the user without specifying a known attribute value that is known about the user;
receiving bids from the content sponsors including one or more conditional bids that each establish a price to be used in an auction for the placement opportunity, wherein each of the one or more conditional bids is for presentation to a user who has a particular attribute value for a particular attribute type;
evaluating the received bids from the content sponsors in view of the known attribute value including using conditional bids that have been received from the content sponsors that have provided a bid for the known attribute value in the auction to determine a winning content item and a winning bid of a winning content sponsor for placement in the placement opportunity;
providing the winning content item for placement in the placement opportunity based on the evaluating; and
providing, to the winning content sponsor, billing information for auctions in which the winning content sponsor participated without revealing any attribute values received for winning bids.

2. The method of claim 1 wherein the placement opportunity is an advertisement slot on a page associated with a publisher.

3. The method of claim 1 wherein the characteristic information includes demographic information and wherein a first attribute type identifies a specific type of demographic information known about the user.

4. The method of claim 1 wherein the characteristic information includes user lists, providing bid requests includes providing identifying information for plural user lists to each of the content sponsors including at least one user list that includes the user and at least one user list that does not include the user.

5. The method of claim 1 wherein the characteristic information includes geo-location data, providing bid requests includes providing plural geo-locations including one in which the user is currently located and at least one in which the user is not currently located.

6. The method of claim 1 wherein the bid request does not include a cookie.

7. The method of claim 1 further comprising charging the winning content sponsor an amount that is based on a price indicated in an associated received conditional bid that specifies a first particular attribute value that is known about the user.

8. The method of claim 1 wherein the characteristic information includes user interests, providing the bid requests including providing an interest area known about the user and at least one interest area not known about the user.

9. The method of claim 1 wherein providing the bid request is in real time after identification of the placement opportunity and wherein bids are received in real time in order to support the real time auction of the placement opportunity.

10. The method of claim 1 further comprising presenting a user interface to a content sponsor that includes the bid request, the characteristic information and a control for enabling the content sponsor to create conditional bids for users having specific attribute values.

11. The method of claim 1 wherein the characteristic information includes plural scenarios, each scenario including one or more attribute types, wherein a first scenario includes the known attribute value that is known about the user and a second scenario includes one or more attribute values that are known not to be associated with the user, and wherein providing the bid request includes providing a request for a bid on each scenario.

12. The method of claim 11 further comprising processing received bids for the first scenario and disregarding bids associated with the second scenario.

13. A computer program product tangibly embodied in a computer-readable storage device and comprising instructions that, when executed by a processor, cause the processor to:
  identify, by one or more processors, a placement opportunity for content to be presented on a user device, a user of the user device being characterized as being included in one or more groups in which each group is defined by the user having a respective attribute value for a respective attribute type;
  provide a bid request to a plurality of content sponsors, the bid request including characteristic information, wherein the characteristic information comprises a plurality of attributes types that each identifies a type of information known to a serving system about the user without specifying a known attribute value that is known about the user;
  receive bids from the content sponsors including one or more conditional bids that each establish a price to be used in an auction for the placement opportunity, wherein each of the one or more conditional bids is for presentation to a user who has a particular attribute value for a particular attribute type;
  evaluate the received bids from the content sponsors in view of the known attribute value including using conditional bids that have been received from the content sponsors that have provided a bid for the known attribute value in the auction to determine a winning content item and a winning bid of a winning content sponsor for placement in the placement opportunity;
  provide the winning content item for placement in the placement opportunity based on the evaluating; and
  provide, to the winning content sponsor, billing information for auctions in which the winning content sponsor participated without revealing any attribute values received for winning bids.

14. The product of claim 13 wherein the placement opportunity is an advertisement slot on a page associated with a publisher.

15. The product of claim 13 wherein the characteristic information includes demographic information and wherein a first attribute type identifies a specific type of demographic information known about the user.

16. The product of claim 13 wherein the characteristic information includes user lists, providing bid requests includes providing identifying information for plural user lists to each of the content sponsors including at least one user list that includes the user and at least one user list that does not include the user.

17. A system comprising:
  one or more processors; and
  one or more memory elements including instructions that when executed cause the one or more processors to:
    identify, by one or more processors, a placement opportunity for content to be presented on a user device, a user of the user device being characterized as being included in one or more groups in which each group is defined by the user having a respective attribute value for a respective attribute type;
    provide a bid request to a plurality of content sponsors, the bid request including characteristic information, wherein the characteristic information comprises a plurality of attributes types that each identifies a type of information known to a serving system about the user without specifying a known attribute value that is known about the user;
    receive bids from the content sponsors including one or more conditional bids that each establish a price to be used in an auction for the placement opportunity, wherein each of the one or more conditional bids is for presentation to a user who has a particular attribute value for a particular attribute type;
    evaluate the received bids from the content sponsors in view of the known attribute value including using conditional bids that have been received from the content sponsors that have provided a bid for the known attribute value in the auction to determine a winning content item and a winning bid of a winning content sponsor for placement in the placement opportunity;
    provide the winning content item for placement in the placement opportunity based on the evaluating; and
    provide, to the winning content sponsor, billing information for auctions in which the winning content sponsor participated without revealing any attribute values received for winning bids.

18. The system of claim 17 wherein the placement opportunity is an advertisement slot on a page associated with a publisher.

19. The system of claim 17 wherein the characteristic information includes demographic information and wherein a first attribute type identifies a specific type of demographic information the user.

20. The system of claim 17 wherein the characteristic information includes user lists, providing bid requests includes providing identifying information for plural user lists to each of the content sponsors including at least one user list that includes the user and at least one user list that does not include the user.

* * * * *